3,321,463
PROCESS FOR THE PREPARATION OF NUCLEOSIDE-5'-POLYPHOSPHATES AND α,ω-BIS-(NUCLEOSIDE-5')POLYPHOSPHATES

John Gilbert Moffatt, Los Altos, Calif., assignor to Syntex Corporation, Panama, Panama, a corporation of Panama
No Drawing. Filed Mar. 17, 1965, Ser. No. 440,588
19 Claims. (Cl. 260—211.5)

This application is a continuation-in-part of my copending U.S. patent application Ser. No. 295,181, filed July 15, 1963.

This invention relates to novel methods of synthesizing nuclesoside-5'-polyphosphates, including α,ω-bis(nucleoside-5')polyphosphates, and to novel intermediates which can be used in said methods.

More particularly, this invention relates, first of all, to novel methods of producing, in high yields, nucleoside-5'-polyphosphates, including α,ω-bis(nucleoside-5')polyphosphates, i.e., nucleoside-5'-diphosphates, -triphosphates, -tetraphosphates, -pentaphosphates and higher polyphosphates, which during the reactions in which they are formed, show little or no tendency to degrade to the corresponding lower phosphates.

This invention also relates to novel terminal phosphoramidate salts of nucleoside-5'-polyphosphates, to methods for the preparation thereof, and to methods for the preparation of higher nucleoside-5'-polyphosphates, including α,ω-bis(nucleoside-5')polyphosphates, therefrom.

Recent progress in biochemical research has shown the unique importance of nucleoside-5'-polyphosphates, and particularly ribonucleoside-5'-di- and -triphosphates and deoxyribonuclesoide-5'-di- and -triphosphates, in biological systems. Thus, for example, the role played by adenosine-5'-triphosphate (ATP) as the primary energy source in many biological systems is well known at the present time.

In addition to ATP, however, nucleoside-5'-di- and -triphosphates in general are known to be essential active intermediates in cellular metabolism, inasmuch as they are the active forms in which nucleosides and nucleoside analogs are incorporated into celular nucleic acids. Thus, they serve as direct precursors of both ribonucleic and deoxyribonucleic acids, as well as of nucleotide coenzymes. Furthermore, various nucleoside-5'-triphosphates also act as specific co-factors for certain biological transformations. For example, guanosine-5'-triphosphate is required in protein synthesis. Finally, numerous α,ω-bis-(nucleoside-5')polyphosphates, e.g., α,ω-bis(adenosine-5')diphosphate, α,ω-bis(guanosine-5')triphosphate, and the like, have been isolated from naturally-occuring materials.

This multiplicity of functions performed by nucleoside-5'-polyphosphates, together with a desire to further study their functions in various biological systems, has led to a considerable demand for more efficient synthetic methods for their preparation.

One of the best general methods of synthesizing nucleoside-5'-polyphosphates containing one nucleoside moiety known to the art at the present time involves first refluxing a solution of a nucleoside-5'-monophosphate, e.g., adenosine-5'-phosphate, with about 5-equivalents of a carbodiimide, preferably N,N'-dicyclohexylcarbodiimide, and about 5 equivalents of an amine such as cyclohexylamine, piperidine, or morpholine, preferably the latter, in 67% aqueous t-butanol. The resulting nucleoside-5'-phosphoramidate carboxamidinium salt, e.g., adenosine-5'-phosphoromorpholidate 4-morpholine N,N'-dicyclohexylcarboxamidinium salt, is then reacted, in anhydrous pyridine, with about a ten-fold excess of a trialkylammonium salt, e.g., the tri-n-butyl-ammonium salt, of the desired inorganic phosphate, e.g., orthophosphate, pyrophosphate, tripolyphosphate, tetrapolyphoshate, and the like, to give the desired nucleoside-5'-polyphosphate, e.g., adenosine-5'-diphosphate, -triphosphate, -tetraphosphate, -pentaphosphate, and the like.

Nevertheless, despite the general applicability of this method, it has been found to have several undesirable features. First of all, yields of the desired higher polyphosphates are only moderate. For example, in the case of the reaction between adenosine-5'-phosphoromorpholidate 4-morpholine N,N'-dicyclohexylcarboxamidium salt and bis-tri-n-butyl-ammonium pyrophosphate in anhydrous pyridine, a yield of only 57% of adenosine-5'-triphosphate was obtained after 2 hours reaction at 25° C. Secondly, and perhaps more important, it has been observed that the desired polyphosphates initially obtained by means of this general method have a marked tendency to degrade during the reaction to the corresponding lower phosphates. Thus, again in the case of the reaction of adenosine-5'-phosphoromorpholidate 4-morpholine N,N'-dicyclohexylcarboxamidinium salt and bis-tri-n-butylammonium pyrophosphate in anhydrous pyridine, further reaction beyond the initial 2 hour reaction period in an attempt to increase the yield of adenosine-5'-triphosphate instead caused adenosine-5'-triphosphate to be largely converted to adenosine-5'-diphosphate, which was found to be present in 76% yield after 24 hours reaction at 25° C. Furthermore, it has been found that this phenomenon is quite general, with the rate of disappearance of the initially formed polyphosphate being a function of the particular nucleotide under consideration. Thus, it is apparent that any modification of the above-described general method which would permit the preparation, in high yields, of nucleoside-5'-polyphosphates which would show little or no tendency to subsequently degrade during the reaction to the corresponding lower phosphates would be of great benefit to the art.

One aspect of the present invention provides such a modification. More particularly, it has been discovered that if the above-described general method is modified by replacing the pyridine solvent with a substantially anhydrous hyrocarbon sulfoxide, and more particularly a dialkylsulfoxide, such as dimethylsulfoxide, methylethylsulfoxide, diethylsulfoxide, methylpropylsulfoxide, ethylpropylsulfoxide, dipropylsulfoxide, methylbutylsulfoxide, dibutylsulfoxide, and the like, which is a solvent for the reactants at the temperature at which the reaction is carried out, high yields of nucleoside-5'-polyphosphates which show little or no tendency to subsequently degrade during the reaction are obtained.

I have also discovered that the above-described general method can be further modified, if desired, by replacing the nucleoside-5'-phosphoramidate carboxamidinium salt with a nucleoside-5'-polyphosphate terminal phosphoramidate salt, such as a carboxamidinium or ammonium salt, or the like, which is then reacted with a tertiary amine salt, preferably an ammonium or substituted ammonium or carboxamidinium salt, of an inorganic phosphate, under substantially anhydrous conditions in a hydrocarbon sulfoxide, to give a higher nucleoside-5'-polyphosphate.

In addition to giving nucleoside-5'-polyphosphates containing a greater number of phosphoryl groups in a single chain than had hitherto been obtainable using prior art methods, this further modification now permits the introduction of radioactively labeled (with $P^{32}$) phosphoryl groups at any position in the polyphosphate moiety, thereby providing specifically labeled nucleoside-5'- polyphosphates which are valuable tools in elucidating the mechanism of many biological reactions. Thus, for example, by reacting adenosine-5'-diphosphate with morpholine in the manner described hereinabove, and then reacting the resulting P¹-(adenosine-5')-P²-(4-morpholino)pyrophosphate carboxamidinium salt with P³²-labeled tri-n-butylammonium orthophosphate, adenosine-5'-triphosphate having a labeled terminal phosphoryl group is obtained. Similarly, by using this labeled ATP as the nucleoside-5'-polyphosphate starting material, the polyphosphate moiety can again be extended and, if desired, additional labeled phosphorus-containing phosphoryl groups can be introduced.

Still another modification of the above-described general process, i.e., the replacement of the inorganic phosphate tertiary amine salt with a nucleoside-5'-or polyphosphate tertiary amine salt, preferably an ammonium or substituted ammonium or carboxamidinium salt, coupled with the replacement of pyridine with a hydrocarbon sulfoxide, provides an efficient method of synthesizing α,ω - bis(nucleoside - 5')polyphosphates. Furthermore, either a nucleoside-5'-phosphoramidate salt or a nucleoside-5'-polyphosphate terminal phosphoramidate salt can be used, and thus α,ω-bis(nucleoside-5')polyphosphates of varying phosphoryl chain length, including those containing labeled phosphoryl groups, can readily be synthesized.

It is, therefore, an object of the present invention to provide novel methods of synthesizing nucleoside-5'- polyphosphates, including α,ω - bis(nucleoside - 5')polyphosphates.

It is also an object of this invention to provide novel methods of producing, in high yields, nucleoside-5'-polyphosphates which, during the reaction in which they are formed, show little or no tendency to degrade to the corresponding lower phosphates.

Another object of the present invention is to provide novel terminal phosphoramidate salts of nucleoside-5'- polyphosphates.

It is also an object of the present invention to provide methods of using said terminal phosphoramidate salts of nucleoside-5'-polyphosphates to prepare higher nucleoside-5'-polyphosphates, including α,ω-bis(nucleoside-5') polyphosphates.

A further object of the present invention is to provide nucleoside-5'-polyphosphates having radioactively labeled phosphorus-containing phosphoryl groups in known positions.

These and other objects of the present invention will be discussed in greater detail hereinbelow.

An illustrative but by no means exhaustive enumeration of nucleoside-5'-polyphosphates which can be prepared by the novel methods of the present invention includes the β-D-ribofuranosyl nucleoside-5'-polyphosphates represented by the general formula:

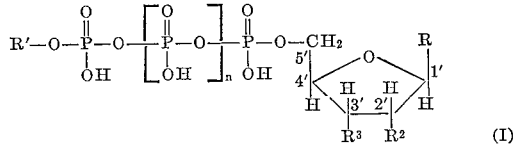

(I)

In this formula R usually represents a substituted or unsubstituted purine or pyrimidine base, such as those represented by the general formulas:

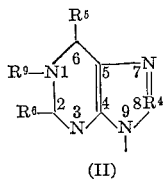 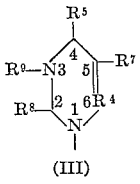

(II) (III)

wherein $R^4$ represents the grouping C-$R^5$ or N, $R^5$ and $R^6$ represent hydrogen, a lower alkyl group, e.g., methyl or ethyl, a hydroxyl group, a keto group, a lower alkyl ether group, e.g., methoxy or ethoxy, an amino group, including monoalkyl- and monoarylamino, e.g., methylamino, ethylamino or benzylamino, and dialkyl- and diarylamino, e.g., dimethylamino, diethylamino or dibenzylamino, an amido group, e.g., acetamido or the like, a mercapto group, including lower alkyl mercapto such as methylmercapto or ethylmercapto, a halogen, i.e., fluorine, chlorine, bromine or iodine, or a halo-lower alkyl group, e.g., trifluoromethyl or the like, $R^7$ represents hydrogen, a lower alkyl group, a hydroxyl group, a halogen, a halo-lower alkyl group, an amino group, including mono- and diaklyl- and arylamino groups, an amido group, a nitro group, a cyano group or a carboxyl group, with $R^5$, $R^6$ and $R^7$ being other than halogen or a halo-lower alkyl group when $R^2$ or $R^3$ represents hydrogen which has been introduced by hydrogenating a halogen substituent, $R^8$ represents a keto group, an imino (N=) group, a thio (S=) group, a mercapto group, including lower alkyl mercapto groups, or a lower alkyl ether group, $R^9$ represents hydrogen, a lower alkyl group, an aryl group, e.g., benzyl or the like, or the absence of a substituent, and $n$ preferably represents an integer of from 0 to 8, inclusive.

In Formulas II and III hereinabove, when $R^5$ is other than keto and $R^9$ indicates the absence of a substituent, there will be a double bond between the nitrogen atom in the 1-position and the carbon atom in the 6-position in the purine mioety, or between the nitrogen atom in the 3-position and the carbon atom in the 4-position in the pyrimidine moiety. Similarly, when $R^6$ is other than keto there will be a double bond between the carbon atom in the 2-position and the nitrogen atom in the 3-position in the purine moiety, and when $R^8$ is other than keto, imino or thio there will be a double bond between the nitrogen atom in the 1-position and the carbon atom in the 2-position in the pyrimidine moiety.

Included among the more commonly encountered of these purine and pyrimidine groups are purine and substituted purines such as adenine, $N^6$-lower alkyladenines, $N^6$-aryladenines, $N^6,N^6$-di(lower)alkyladenines, $N^6,N^6$-di-aryladenines, 2-aminoadenine, 2-methylaminoadenine, 2-dimethylaminoadenine, 2-acetamidoadenine, 2-hydroxyadenine, 2-methoxyadenine, 2-methylthioadenine, 2-fluoroadenine, 2-chloroadenine, 2,8-dichloroadenine, 8-azaadenine, guanine, isoguanine, 1-methylguanine, $N^2$-methylguanine, $N^2,N^2$-dimethylguanine, 6-thioguanine, 8-azaguaine, xanthine, hypoxanthine, 1-methylpoxanthine, 1-benzylhypoxanthine, 6-methylpurine, 2-aminopurine, 2-dimethylaminopurine, 2-amino-6-chloropurine, 2-fluoropurine, 2-chloropurine, 6-chloropurine, 2,6-dichloropurine, 2-chloro-6-methoxypurine, 2-methoxypurine, 2,6-dimethoxypurine, 2-mercaptopurine, 6-mercaptopurine, 2-methylthiopurine, 6-ethylthiopurine, and the like, and pyrimidine and substituted pyrimidines such as uracil, 2-O-methyluracil, 2-O-ethyluracil, 2-thiouracil, 3-methyluracil, 5-amino- 3-methyluracil, 5-bromo-3-methyluracil, 5-chloro-3-methyluracil, 5-cyano-3-methyluracil, 4-O-methyluracil, 4-O-ethyluracil, 4-thiouracil, 5-fluoro-4-thiouracil, 5-aminouracil, 5-fluorouracil, 5-chlorouracil, 5-bromouracil, 5-iodouracil, 5-trifluoromethyluracil, 5-cyanouracil, 5-hydroxyuracil, 5-nitrouracil, 6-aminouracil, 6-azauracil, cytosine, 5-aminocytosine, 5-methylcytosine, 5-fluorocytosine, 5-chlorocytosine, 5-bromocytosine, 5-iodocytosine, 5-trifluoromethylcytosine, N,5-dimethylcytosine, 6-azacytosine, thymine, 2-thiothymine, 4-thiothymine, 3-methylthymine, 4-O-ethylthymine, and the like.

Other N-heterocyclic ring systems, e.g., substituted 1,3, 5-triazine rings and the like, can also be employed as the N-heterocyclic portion of the molecule.

Again considering Formula I hereinabove, $R^1$ represents hydrogen or the grouping

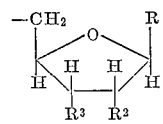

(IV)

and this second nucleoside moiety, when present, can be the same as or different than the other nucleoside moiety in the α,ω-bis(nucleoside-5')polyphosphate, $R^2$ and $R^3$ can each represent hydrogen, fluorine, chlorine, bromine, iodine, a hydroxyl group, an acyloxy group, an amino group, including mono- and dialkyl and -arylamino groups, a mercapto group, including lower alkyl mercapto groups, an amido group, a labile ether group, i.e., one which is easily removable by acid hydrolysis, such as a tetrahydrofuranyloxy, tetrahydropyranyloxy, diphenylmethoxy, triphenylmethoxy or benzyloxy group, or together they can represent a grouping represented by the general formula:

(V)

wherein $R^{10}$ represents hydrogen or a lower alkyl group, e.g., methyl, ethyl, propyl and the like, and $R^{11}$ represents hydrogen, a lower alkyl group, or a monocyclic aryl (including alkaryl and aralkyl) group, e.g., phenyl, tolyl, xylyl, benzyl, and the like, with no more than one of $R^{10}$ and $R^{11}$ being hydrogen, and $n$ preferably represents an integer of from 0 to 8, inclusive.

Besides free phosphoryl group-containing compounds such as those depicted in Formula I hereinabove, the present invention also contemplates the preparation of the various salts thereof, e.g., the corresponding alkali metal salts, such as lithium, sodium and potassium salts, alkaline earth metal salts, such as barium, strontium and calcium salts, ammonium and substituted ammonium salts, such as trimethyl-, triethyl- and tributylammonium salts, carboxyamidinium salts, such as 4-morpholine-N,N'-dicyclohexylcarboxamidinium salts, and the like.

The acyloxy groups referred to herein are preferably derived from saturated or unsaturated hydrocarbon carboxylic acids containing less than 12 carbon atoms. These acids can be straight-chain, branched, cyclic, cyclic-aliphatic or aromatic, and can either be unsubstituted or substituted with one or more non-interfering substituents, such as free or functionally converted hydroxy groups, e.g., alkoxy and aryloxy groups containing up to 6 carbon atoms or acyloxy groups containing up to 12 carbon atoms, nitro groups, amino groups or halogen atoms. Included among such preferred acyloxy groups are those derived from acetic, trimethylacetic, t-butylacetic, phenoxyacetic, aminoacetic, trifluoroacetic, propionic, cyclopentylpropionic, β-chloropropionic, enanthic and benzoic acids.

In addition to the β-D-ribofuranosyl nucleoside-5'-polyphosphates illustrated by Formula I hereinabove, nucleoside-5'-polyphosphates containing one or two purine or pyrimidine groups such as those represented by Formulas II and III hereinabove bonded to other sugar moieties, such as those obtained from glucose, xylose, arabinose, galactose, fructose, maltose, mannose, rhamnose, and the like, can also be prepared by the novel methods of the present invention.

In all cases, the unphosphorylated nucleosides themselves are known or are obtainable by general chemical and enzymatic synthetic methods of combining a purine or pyrimidine moiety with a sugar moiety, e.g., methods such as those shown by Pontis et al., Biochem. Biophys. Acta, 51, 138 (1961); Fox et al., J. Am. Chem. Soc., 83, 4066 (1961); Šorm et al., Coll. Czech. Chem. Comm., 28, 2588 (1963); Fox et al., "Advances in Carbohydrate Chemistry," 14 (New York: Academic Press, 1959), 283 et seq. and Montgomery et al., "Advances in Carbohydrate Chemistry," 17 (1962), 301 et seq., and the unphosphorylated nucleosides can be phosphorylated at the 5'-position to give the corresponding 5'-monophosphates by reacting them, at room temperature (about 25° C.) in anhydrous pyridine, with 2-cyanoethyl phosphate in the presence of a di(lower alkyl) or dicycloalkylcarbodiimide, e.g., dicyclohexylcarbodiimide or the like, in the manner described by Tener et al. in J. Am. Chem. Soc., 83, 159 (1961), with said 5'-monophosphates usually being recovered in the form of their salts rather than as the free acids.

Included among the nucleoside-5'-polyphosphates containing one nucleoside moiety which are represented by Formula I hereinabove are such compounds as the 5'-diphosphates, -triphosphates, -tetraphosphates, -pentaphosphates and higher polyphosphates of adenosine, 2-acetamidoadenosine, 2-aminoadenosine, $N^6$-benzyladenosine, $N^6$-cyclohexyl-3'-amino-3'-deoxyadenosine, 2-dimethylaminoadenosine, 2-fluoroadenosine, 2-chloroadenosine, 2-hydroxyadenosine, 2-methoxyadenosine, 2-methyladenosine, 2-methylaminoadenosine, 2-methylthioadenosine, $N^6,N^6$-dimethyladenosine,
$N^6,N^6$-dimethyl-2'-acetamido-2'-deoxyadenosine,
$N^6,N^6$-diethyl-3'-acetamido-3'-deoxyadenosine,
$N^6,N^6$-dimethyl-2',3'-O-benzylideneadenosine,
2'-deoxyadenosine,
2',3'-O-isopropylideneadenosine,
8-azaadenosine,
guanosine,
1-methylguanosine,
6-thio-2',3'-O-isopropylideneguanosine,
2'-deoxyguanosine,
2',3'-O-isopropylideneguanosine,
2',3'-O-isopropylideneinosine,
8-azaguanosine,
xanthosine,
2'-deoxyxanthosine,
inosine,
1-methylinosine,
1-benzylinosine,
2'-deoxyinosine,
2',3'-O-isopropylideneinosine,
9-(β-D-ribofuranosyl)purine,
9-(β-D-ribofuranosyl-2,3-di-O-acetyl)purine,
2-amino-9-(β-D-ribofuranosyl)purine,
2-fluoro-9-(β-Dribofuranosyl)purine,
2-chloro-9-(β-D-ribofuranosyl)purine,
6-chloro-9-(β-D-ribofuranosyl)purine,
6-chloro-9-(β-D-ribofuranosyl-2,3-O-isopropylidene) purine,
2-dimethylamino-9-(β-D-ribofuranosyl)purine,
2-mercapto-9-(β-D-ribofuranosyl)purine,
6-mercapto-9-(β-D-ribofuranosyl)purine,
6-methyl-9-(β-D-ribofuranosyl)purine,
2-amino-6-chloro-9-(β-D-ribofuranosyl)purine,
2-chloro-6-methoxy-9-(β-D-ribofuranosyl)purine,
2,6-dimethoxy-9-(β-D-ribofuranosyl)purine,
uridine,
2-O-methyl-2',3'-di-O-acetyluridine,
2-O-ethyl-2',3'-O-isopropylideneuridine,
2-thiouridine,
2-thio-2',3'-O-isopropylideneuridine,
5-cyano-2-thiouridine,
5-cyano-2-thio-2',3'-O-isopropylideneuridine,
3-methyluridine,
5-amino-3-methyluridine,
5-bromo-3-methyluridine,
5-chloro-3-methyluridine,
4-thiouridine,
5-aminouridine,
5-fluorouridine,
5-chlorouridine,
5-bromouridine,
5-iodouridine,
5-hydroxyuridine,
5-cyanouridine,
5-nitrouridine,
5-nitro-2',3'-O-isopropylideneuridine,
2',3'-di-O-acetyluridine,
2',3'-di-O-benzyluridine,
2',3'-O-isopropylideneuridine, 2',3'-O-isopropylideneuridine,
2',3'-di-O-methyluridine,
3'-S-ethyl-3'-thiouridine,
2'-deoxyuridine,
2-thio-2'-deoxyuridine,
2'-deoxy-3'-O-tetrahydropyranyluridine,
2'-deoxy-2'-fluorouridine,
2'-chloro-2'-deoxyuridine,
2'-bromo-2'-deoxyuridine,
2'-deoxy-2'-iodouridine,
2'-deoxy-5-fluorouridine,
5-chloro-2'-deoxyuridine,
5-bromo-2'-deoxyuridine,
2'-deoxy-5-iodouridine,
2'-deoxy-5-trifluoromethyluridine,
2'-deoxy-5-hydroxyuridine,
3'-deoxyuridine,
3'-amino-3'-deoxyuridine,
2',3'-dideoxyuridine,
2',3'-dideoxy-3'-iodouridine,
6-azauridine,
2',3'-O-isopropylidene-6-azauridine,
2',3'-dideoxy-6-azauridine,
2',3'-dideoxy-3'-iodo-6-azauridine,
cytidine,
2',3'-O-benzylidenecytidine,
2',3'-O-isopropylidenecytidine,
5-aminocytidine,
5-fluorocytidine,
5-chlorocytidine,
5-bromocytidine,
5-methylcytidine,
N,5-dimethylcytidine,
2'-deoxycytidine,
2-thio-2'-deoxycytidine,
2'-deoxy-3'-O-acetylcytidine,
2'-deoxy-5-fluorocytidine,
5-chloro-2'-deoxycytidine,
5-bromo-2'-deoxycytidine,
2'-deoxy-5-trifluoromethylcytidine,
2'-deoxy-5-hydroxycytidine,
2'-deoxy-5-methylcytidine,
2'-deoxy-N,5-dimethylcytidine,
3'-amino-3'-deoxycytidine,
thymidine,
2-thiothymidine,
3-methylthymidine,
3'-O-acetylthymidine,
3'-deoxythymidine,
3'-chloro-3'-deoxythymidine,
3'-bromo-3'-deoxythymidene,
3'-deoxy-3'-iodothymidine,
3'-amino-3'-deoxythymidine, and the like, as well as the various salts thereof.

Included among the novel $\alpha,\omega$-bis(nucleoside-5')polyphosphates which are represented by Formula I hereinabove are $\alpha,\beta$-bis(adenosine-5')diphosphate,
$\alpha,\gamma$-bis(adenosine-5')triphosphate,
$\alpha,\delta$-bis(adenosine-5')tetraphosphate,
$\alpha,\epsilon$-bis(adenosine-5')pentaphosphate,
$\alpha,\zeta$-bis(adenosine-5')hexaphosphate,
$\alpha,\gamma$-bis(2'-deoxyadenosine-5')triphosphate,
$\alpha,\beta$-bis(8-azaadenosine-5')diphosphate,
$\alpha,\beta$-bis(guanosine-5')diphosphate,
$\alpha,\gamma$-bis(guanosine-5')triphosphate,
$\alpha,\zeta$-bis(guanosine-5')tetraphosphate,
$\alpha,\epsilon$-bis(guanosine-5')pentaphosphate,
$\alpha,\epsilon$-bis(2'-deoxyguanosine-5')pentaphosphate,
$\alpha,\beta$-bis(8-azaguanosine-5')diphosphate,
$\alpha,\beta$-bis(xanthosine-5')diphosphate,
$\alpha,\zeta$-bis(xanthosine-5')tetraphosphate,
$\alpha,\gamma$-bis(2'-deoxyxanthosine-5')triphosphate,
$\alpha,\beta$-bis(inosine-5')diphosphate,
$\alpha,\epsilon$-bis(inosine-5')pentaphosphate,
$\alpha,\zeta$-bis(2'-deoxyinosine-5')tetraphosphate,
$\alpha,\beta$-bis[9-($\beta$-D-ribofuranosyl)purine-5']diphosphate,
$\alpha,\gamma$-bis[9-($\beta$-D-ribofuranosyl)purine-5']triphosphate,
$\alpha,\zeta$-bis[9-($\beta$-D-ribofuranosyl)purine-5']tetraphosphate,
$\alpha,\epsilon$-bis[9-($\beta$-D-ribofuranosyl)purine-5']pentaphosphate,
$\alpha,\beta$-bis(uridine-5')diphosphate,
$\alpha,\gamma$-bis(uridine-5')triphosphate,
$\alpha,\delta$-bis(uridine-5')tetraphosphate,
$\alpha,\epsilon$-bis(uridine-5')pentaphosphate,
$\alpha,\beta$-bis(2'-deoxyuridine-5')diphosphate,
$\alpha,\gamma$-bis(6-azauridine-5')triphosphate,
$\alpha,\beta$-bis(cytidine-5')diphosphate,
$\alpha,\gamma$-bis(cytidine-5')triphosphate,
$\alpha,\zeta$-bis(cytidine-5')tetraphosphate,
$\alpha,\epsilon$-bis(cytidine-5')pentaphosphate,
$\alpha,\epsilon$-bis(2'-deoxycytidine-5')pentaphosphate,
$\alpha,\beta$-bis(thymidine-5')diphosphate,
$\alpha,\gamma$-bis(thymidine-5')triphosphate,
$\alpha,\xi$-bis(thymidine-5')tetraphosphate,
$\alpha,\epsilon$-bis(thymidine-5')pentaphosphate,
$\alpha$-(adenosine-5')-$\beta$-(guanosine-5')diphosphate,
$\alpha$-(adenosine-5')-$\gamma$-(2'-deoxyadenosine-5')triphosphate,
$\alpha$-(adenosine-5')-$\epsilon$-(8-azaguanosine-5')pentaphosphate,
$\alpha$-(uridine-5')-$\zeta$-(cytidine-5')tetraphosphate,
$\alpha$-(2'-deoxyuridine-5')-$\beta$-(thymidine-5')diphosphate,
and the like, as well as the various salts thereof.

As previously indicated, one of the starting materials used in preparing nucleoside-5'-polyphosphates, including $\alpha,\omega$-bis-(nucleoside-5')polyphosphates, by the novel methods of the present invention can be the corresponding nucleoside-5'-phosphoramidate, preferably in the form of a tertiary amine salt, such as a carboxamidinium or ammonium salt.

Among the carbodiimides which can be used in preparing nucleoside-5'-phosphoramidate carboxamidinium salts are N,N'-di(hydrocarbon substituted)carbodiimides, e.g., N,N'-dialkyl (including cycloalkyl)carbodiimides such as N,N'-dimethylcarbodiimide, N,N'-diethylcarbodiimide, N,N'-di-n-propylcarbodiimide, N,N'-diisopropylcarbodiimide, N,N'-dibutylcarbodiimide, N,N'-dicyclohexylcarbodiimide, N,N'-di(methylcyclohexyl)carbodiimide, and the like, N,N'-diarylcarbodiimides, such as N,N'-di-p-tolylcarbodiimide, N,N'-di-m-xylylcarbodiimide, and the like, and N-alkyl-N'-arylcarbodiimides, such as N-cyclohexyl-N'-(4-pyridylmethyl)carbodiimide (which can be prepared by the condensation of cyclohexylisothiocyanate and 4-aminomethylpyridine followed by desulfurization with sodium hypochlorite or mercuric oxide), and the like.

Besides the carbodiimides, other dehydrating agents, such as carbonyldiimidazole [Cramer et al., Chem. Ber., 94, 1621 (1961); 95, 1664 (1962) and Goldman et al., J. Am. Chem. Soc., 82, 2969 (1960)], ethoxyacetylene [Wasserman et al., J. Am. Chem. Soc., 82, 4435 (1960)], N-ethyl-5-phenylisoxazolium 3'-sulfonate [Woodward, J. Am. Chem. Soc., 83, 1010 (1961) and Jacob et al., Chem. & Ind., 932 (1962)], diphenyl phosphorochloridate [Michelson, Chem. & Ind., 1267 (1960)] and the like, can also be used in preparing the nucleoside-5'-phosphoramidate, which can then be isolated as the corresponding salt.

In general, ammonia or any aliphatic, alicyclic, aromatic hydrocarbon or heterocyclic primary or secondary monoamine or polyamine, and preferably one containing up to 30 carbon atoms, inclusive, wherein the nitrogen which is ultimately bonded to the phosphorus atom in the 5'-phosphoryl group can be attached to a primary, secondary or tertiary carbon atom, can be used, together with the carbodiimide or other dehydrating agent, in preparing the nucleoside-5'-phosphoramidate salt.

An illustrative but by no means exhaustive listing of such amines includes aliphatic and cycloaliphatic primary monoamines such as methylamine, ethylamine, n-propylamine, isopropylamine, n-butylamine, sec-butylamine, t-butylamine, n-amylamine, 2-amino-4-methylpentane, other amyl, hexyl, heptyl, octyl and higher primary monoamines, cyclopentylamine, cyclohexylamine, ring-alkylated cyclopentyl- and cyclohexylamines, vinylamine, allylamine, cyclohexenylamine, and the like, aliphatic and cycloaliphatic secondary monoamines, such as dimethylamine, diethylamine, di-n-propylamine, diisopropylamine, di-n-butylamine, N-methyl-n-butylamine, N-ethyl-n-butylamine, N-methylcyclohexylamine, N-ethylcyclohexylamine, N-butylcyclohexylamine, dicyclopentylamine, dicyclohexylamine, ring-alkylated dicyclohexylamines, and the like, arylamines such as benzylamine, ring-alkylated benzylamines, β-phenylethylamine, aniline, o-, m- and p-fluoro, -chloro and -bromoaniline, o-, m- and p-nitroaniline, o-, m- and p-anisidine, o-, m- and p-toluidine, o-, m- and p-aminoacetophenone, tetrahydro-β-naphthylamine, 5,10-dihydroacridine, N-methylaniline, diphenylamine, dibenzylamine, and the like, heterocyclic amines such as pyrrolidine, piperidine, 2-, 3- and 4-pipecoline, piperazine, furfurylamine, tetrahydrofurfurylamine, morpholine, imidazole, and the like, and steroidal amines such as 17-β-amino-Δ$^5$-androsten-3β-ol, 7α-aminocholesterol, 16α-cyclohexylaminopregnan-20-one, and the like.

These nucleoside-5'-phosphoramidates can be prepared by the method described by Moffatt et al., in J. Am. Chem. Soc., 83, 649 (1961), and will be isolated either as the amine-carboxamidinium salts or as other salts, if desired. Illustrative examples of the compounds which can be prepared thereby include: adenosine-5'-phosphoropiperidate 4-morpholine N,N'-dicyclohexylcarboxamidinium salt, adenosine-5'-phosphoromorpholidate 4-morpholine N,N'-dicyclohexylcarboxamidinium salt, adenosine-5'-phosphoropiperidate 1-piperidine N,N'-dicyclohexylcarboxamidinium salt, 2'-deoxyadenosine-5'-phosphoromorpholidate 4-morpholine N,N'-dicyclohexylcarboxamidinium salt, guanosine-5'-phosphoropiperidate 4-morpholine N,N'-dibutylcarboxamidinium salt, 2'-deoxyguanosine-5'-phosphoromorpholidate 4-morpholine N,N'-dicyclohexylcarboxamidinium salt, cytidine-5'-phosphoropiperidate 1-piperidine N,N'-diisopropylcarboxamidinium salt, cytidine-5'-phosphoromorpholidate 4-morpholine N,N'-dicyclohexylcarboxamidinium salt, 2'-deoxycytidine-5'-phosphoropyrrolidate 1-pyrrolidine N,N'-di-p-tolylcarboxamidinium salt, 2'-deoxycytidine-5'-phosphoromorpholidate 4-morpholine N,N'-dicyclohexylcarboxamidinium salt, thymidine-5'-phosphoromorpholidate 4-morpholine N,N'-dicyclohexylcarboxamidinium salt, uridine-5'-phosphoropiperidate 1-piperidine N,N'-di(methylcyclohexyl)-carboxamidinium salt, 6-azauridine-5'-phosphoromorpholidate 4-morpholine N,N'-dicyclohexylcarboxamidinium salt, 8-azaguanosine-5'-phosphoromorpholidate 4-morpholine N,N'-dicyclohexylcarboxamidinium salt, and the like.

By replacing the nucleoside-5'-monophosphate starting material with a nucleoside-5'-polyphosphate containing one nucleoside moiety, this method can also be used to prepare the novel terminal phosphoramidate salts of the present invention, said terminal phosphoramidate salts being represented by the general formula:

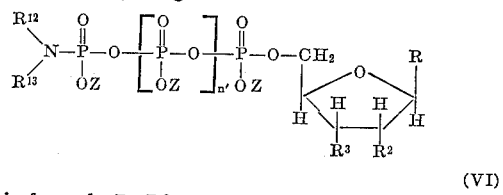

(VI)

In this formula R, R$^2$ and R$^3$ have the same meanings as set forth hereinabove for Formula I, R$^{12}$ and R$^{13}$ represent the substituent or substituents attached to the nitrogen atom in the amine employed, i.e., R$^{12}$ and R$^{13}$ can each represent hydrogen, a hydrocarbon radical, e.g., an alkyl (including straight- and branched-chain alkyl and cycloalkyl) group or an alkenyl (including straight- and branched-chain alkenyl and cycloalkenyl) group, preferably one containing from 1 to 12 carbon atoms, inclusive, such as methyl, ethyl, propyl, isopropyl, cyclopentyl, cyclohexyl, vinyl, allyl, methallyl, cyclohexenyl, and the like, or a monocyclic aryl (including alkaryl and aralkyl) group, preferably one containing from 6 to 9 carbon atoms, inclusive, such as phenyl, tolyl, xylyl, benzyl, and the like, or, taken singly or together, R$^{12}$ and R$^{13}$ can represent a saturated or unsaturated (including aromatic) fused hydrocarbon ring system, preferably one containing from 9 to 30 carbon atoms, inclusive, such as indanyl, indenyl, naphthyl, acenaphthenyl, anthryl or cyclopentanopolyhydrophenanthryl rings, and the like, or, again taken singly or together, R$^{12}$ and R$^{13}$ can represent a monocyclic heterocyclic ring system, preferably one containing up to 8 carbon atoms, such as pyrryl, pyrrolidyl, pyridyl, piperidyl, furyl, furfuryl, morpholinyl, imidazolyl or thienyl, and the like, all of which can either be unsubstituted with one or more non-interfering substituents, e.g., hydroxyl groups, acyloxy groups, esterified carboxyl groups, ether and ketal groups, amino (including substituted amino) groups, nitro groups, halogens, and the like.

The preferred substitutents represented by R$^{12}$ and R$^{13}$ are hydrogen, lower alkyl groups, monocyclic aryl groups, and pyrrolidyl, piperidyl and morpholinyl groups, with R$^{12}$ and R$^{13}$, together with the nitrogen atom to which they are attached, being taken together to form these last three heterocyclic groups.

Z represents a salt-forming radical, e.g., one of those mentioned hereinabove in connection with Formula I, and preferably an ammonium or substituted ammonium or carboxamidinium radical, and n' preferably represents an integer of from 0 to 5, inclusive.

Here too, in addition to the β-D-ribofuranosyl nucleoside-5'-polyphosphate terminal phosphoramidate salts illustrated by Formula VI hereinabove, nucleoside-5'-polyphosphate terminal phosphoramidate salts containing a purine or pyrimidine group such as those represented by Formulas II and III hereinabove bonded to other sugar moieties, such as those mentioned hereinabove, can also be prepared.

Included among these novel nucleoside-5'-polyphosphate terminal phosphoramidate salts are the calcium, triethylammonium and 4-morpholine N,N'-dicyclohexylcarboxamidinium salts of P$^1$-(adenosine-5')-P$^2$-aminodiphosphate, P$^1$-(adenosine-5')-P$^2$-(4-morpholino)diphosphate, P$^1$-(adenosine-5')-P$^3$-(4-morpholino)triphosphate, P$^1$-(adenosine-5')-P$^3$-diethylaminotriphosphate, P$^1$-(adenosine-5')-P$^4$-(1-piperidino)tetraphosphate, P$^1$-(adenosine-5')-P$^5$-(4-morpholino)pentaphosphate, P$^1$-(2'-deoxyadenosine-5')-P$^3$-(1-pyrrolidino)triphosphate, P$^1$-(2'-deoxyadenosine-5')-P$^5$-(1-pyrrolidino)pentaphosphate, P$^1$-(guanosine-5')-P$^2$-(4-morpholino)diphosphate, P$^1$-(2'-deoxyguanosine-5')-P$^4$-dimethylaminotetraphosphate, P$^1$-(2'-deoxyguanosine-5')-P$^5$-(1-pyrrolidino)pentaphosphate, P$^1$-(xanthosine-5')-P$^2$-(1-pyrrolidino)diphosphate, P$^1$-[9-(β-D-ribofuranosyl)purine-5']-P$^2$-(4-morpholino)diphosphate, P$^1$-[9-(β-D-ribofuranosyl)purine-5']-P$^5$-(1-piperidino)pentaphosphate, P$^1$-[9-(β-D-ribofuranosyl)purine-5']-P$^5$-(1-pyrrolidino)pentaphosphate, P$^1$-(uridine-5')-P$^2$-(1-pyrrolidino)diphosphate, P$^1$-(uridine-5')-P$^2$-(4-morpholino)diphosphate, P$^1$-(uridine-5')-P$^3$-benzylaminotriphosphate, P$^1$-(uridine-5')-P$^5$-n-butylaminopentaphosphate, P$^1$-(2'-deoxyuridine-5')-P$^4$-(4-morpholino)tetraphosphate, P$^1$-(6-azauridine-5')-P$^2$-(4-morpholino)diphosphate, P$^1$-(cytidine-5')-P$^2$-(4-morpholino)diphosphate, P$^1$-(2'-deoxycytidine-5')-P$^4$-diethylamino-tetraphosphate, P$^1$-(thymidine-5')-P$^2$-(4-morpholino)diphosphate, and the like.

The hydrocarbon sulfoxide employed as the solvent in the novel methods of the present invention must be substantially anhydrous, i.e., it should have as low a moisture content as can be practicably achieved. One relatively simple method of arriving at a low moisture content, e.g., a moisture content of from about 1 part to about 10 parts per million of water by weight, based on the total weight of the sulfoxide, and therefore, the method which is preferred in practicing the present invention, involves carefully drying the sulfoxide over a molecular sieve, such as Linde Type 4A or 10X (which are commercially available beads or pellets of alkali metal aluminosilicates), for from about 3 days to about 7 days at a temperature of from about 20° C. to about 30° C. Of course, variations in the above-stated temperatures and times, as well as entirely different drying methods, can be employed, if desired, to render the sulfoxide substantially anhydrous.

In preparing nucleoside-5'-polyphosphates containing one nucleoside moiety, the inorganic phosphate which is reacted with the nucleoside-5'-phosphoramidate or nucleoside-5'-polyphosphate terminal phosphoramidate salt is one which contains one or more, e.g., from 1 to 4, phosphoryl groups, i.e.,

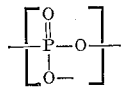

Thus, the inorganic phosphate can be an orthophosphate, pyrophosphate, tripolyphosphate, tetrapolyphosphate, or the like, including radioactively labeled phosphorus-containing phosphates, and especially orthophosphate, and it will be used in the form of a tertiary amine salt, preferably an ammonium (including substituted ammonium) salt, e.g., a trialkylammonium salt such as the trimethyl-, triethyl-, tripropyl-, tri-n-butyl-, triamyl-, trihexyl- or trioctylammonium salt, and the like, or a carboxamidinium salt. The tertiary amine salt will preferably be formed prior to contacting the inorganic phosphate with the nucleoside-5'-phosphoramidate carboxamidinium salt. It can be formed simply by adding the desired tertiary amine to a salt of the inorganic phosphate with a relatively weak base, e.g., pyridine, thereby effecting an exchange.

The preferred reaction procedure involves first separately rendering the nucleoside-5'-phosphoramidate or nucleoside-5'-polyphosphate terminal phosphoramidate salt, preferably a carboxamidinium or ammonium salt, and the inorganic phosphate tertiary amine salt substantially anhydrous, i.e., removing substantially all water therefrom which is not chemically bound, bringing them each to a moisture content of not more than about 0.01% by weight, and preferably not more than about 0.005% by weight, based on the total weight of the reactant. This can be accomplished, for example, by evaporating each of these reactants under vacuum several times with from about 100 to about 200 times its weight of anhydrous pyridine, until the desired moisture content has been attained, and then evaporating the residue several times under vacuum with benzene to remove any traces of pyridine. Next, the reactants are added to the dried hydrocarbon sulfoxide, e.g., dimethylsulfoxide, and reacted at a temperature of from about 10° C. to about 100° C., and preferably at a temperature of from about 25° C. to about 50° C., for from about 1 hour to about 6 days. From about 0.5 to about 10 molar equivalents, and preferably from about 3 to about 5 molar equivalents, of the inorganic phosphate will generally be employed per molar equivalent of the nucleoside-5'-phosphoramidate or nucleoside-5'-polyphosphate terminal phosphoramidate salt, while the amount of sulfoxide employed generally will be from about 3 to about 10 times the total weight of the reactants.

Essentially the same procedure is employed in preparing α,ω-bis(nucleoside-5')polyphosphates, with the exception that the inorganic phosphate tertiary amine salt is replaced by a nucleoside-5'-mono- or polyphosphate tertiary amine salt, in which the phosphate moiety can also contain, if desired, a radioactively labeled phosphorus-containing phosphoryl group.

Isolation of the nucleoside-5'-polyphosphates and α,ω-bis(nucleoside-5')polyphosphates from the reaction mixture in a water soluble, non-hygroscopic solid form is readily accomplished by first separating the products by means of ion exchange chromatography on a commercially available DEAE (diethylaminoethyl) cellulose column in the bicarbonate form, using a linear gradient of triethylammonium bicarbonate as the eluant, next removing excess trialkylammonium bicarbonate by low temperature evaporation, preferably at about 1 mm. Hg pressure using a rotatory type evaporator in which the condensing bulb is cooled with circulating aqueous glycol at −10 to −20° C., and finally adding an excess of an alkali metal or alkaline earth metal iodide, e.g., sodium iodide or the like, in acetone to a concentrated solution of the resulting trialkylammonium salt of the nucleotide or α,ω-bis(nucleotide) in methanol and recovering the resulting alkali or alkaline earth metal salt. The products directly obtained by this procedure are suitable for use as such as biochemical studies.

Similar procedures which are well known to those skilled in the art can be used to prepare other salts of these nucleotides and bis(nucleotides). In addition, the free nucleotides and bis nucleotides themselves can be readily prepared from their salts by dissolving the salt in water and passing the resulting solution through a column containing a suitable ion-exchange resin, e.g., a "Dowex" (Dow Chemical Co.) or "Amberlite" (Rohm & Haas Co.) ion-exchange resin in the acid form, such as Dowex 50 (cross-linked polystyrene) or Amberlite IR-120, and recovering the free nucleotide or bis(nucleotide) from the eluate.

It should be readily apparent from the foregoing description of the preferred method of synthesizing nucleoside-5'-polyphosphates according to the novel process of the present invention that the only critical factor is the use of substantially anhydrous reactants and solvent, and that reaction temperatures and times, amounts of reactants, the order of addition of the reactants, and the like, can be varied to a considerable extent.

It should also be apparent that the limits given hereinabove for the length of the phosphoryl chain in nucleoside-5'-polyphosphates and nucleoside-5'-polyphosphate terminal phosphoramidate salts prepared by the novel methods of the present invention, as expressed by $n$ and $n'$, merely represent preferred ranges, inasmuch as additional phosphoryl groups can be introduced into both nucleoside-5'-polyphosphates containing one nucleoside moiety and the corresponding terminal phosphoramidate salts merely by repeating the appropriate procedures described hereinabove.

In addition to being valuable in the study of numerous biological systems and, in many cases, as intermediates for the preparation of other interesting nucleoside derivatives, the compounds represented by Formulas I and VI hereinabove exhibit anitmetabolic activity as well as antibacterial and antifungal activity against a wide variety of organisms, including *Staphylococcus aureus, Proteus vulgaris, Klebsiella pneumoniae* and *Escherichia coli.*

In order that those skilled in the art can more fully understand the present invention, the following examples are set forth. These examples are given solely for the purpose of illustrating the invention, and should not be considered as expressing limitations unless so set forth in the appended claims. All parts and percentages are by weight, unless otherwise stated.

*Example I*

A 1 mmol (millimol) portion of reagent grade tetrasodium pyrophosphate decahydrate, dissolved in 10 ml. of water, was passed through a column containing Dowex 50–W ion exchange resin (sulfonated polystyrene beads; 8% cross-linked) in the pyridine form. The resin was then washed with 30 ml. of water, these washings were added to the previous effluent, and the total effluent was then evaporated under vacuum (at about 1 mm. Hg pressure, using a rotatory type evaporator) to a volume of about 10 ml. Thirty ml. of pyridine were then added, followed by 4.2 mmols of tri-n-butylamine. The resulting homogeneous solution was evaporated to a syrup and then rendered substantially anhydrous by four successive evaporations under vacuum with 10 ml. portions of pyridine which had previously been dried by distillation from, and storage over, calcium hydride. The residual pyridine was then removed from the anhydrous syrup by two evaporations with 5 ml. portions of benzene which had previously been dried using calcium hydride.

A 0.25 mmol portion of the 4-morpholine-N,N'-dicyclohexylcarboxamidinium salt of 2'-deoxyadenosine-5'-phosphoromorpholidate, prepared, as were all the other nucleoside-5'-phosporamidate carboxamidinium salts used in these examples, by the method of Moffatt et al., loc. cit., was rendered substantially anhydrous by two evaporations under vacuum with 5 ml. portions of pyridine followed by two evaporations of the residue under vacuum with 5 ml. portions of benzene.

Dimethylsulfoxide was rendered substantially anhydrous by distillation from, and storage for 4 days at room temperature (about 25° C.) over, Linde Molecular Sieve Type 10X.

The pyrophosphate was then dissolved in four separate 1 ml. portions of the dimethylsulfoxide, which were then added successively to the phosphoromorpholidate. The resulting clear solution was kept at room temperature for 4 days, with the disappearance of the phosphoromorpholidate being readily followed by descending paper chromatography on Schleicher and Schuell No. 589 Orange Ribbon paper, using a 6:3:1 mixture of n-propanol: ammonium hydroxide:water as the solvent and localizing the compounds by examination under ultraviolet light.

Following this reaction period, 30 ml. of water were added to the reaction mixture and the resulting solution was then directly applied to a 2X 30 cm. column of DEAE cellulose in the bicarbonate form. The column was then washed with water until the optical density of the effluent fell to zero, and the components were then eluted using a linear gradient of triethylammonium bicarbonate, with the mixing vessel containing 1500 ml. of water and the reservoir containing 1500 ml. of aqueous 0.35 M trimethylammonium bicarbonate solution.

Ultraviolet examination of the eluate showed four clearly separated ultraviolet absorbing peaks, and the recovery of optical density was quantitative. The product distributions, together with those of the products of Example II, are shown in Table I below.

The pooled triphosphate peak was evaporated to dryness at a water bath temperature of 30–35° C., and all residual triethylammonium bicarbonate was removed by four evaporations with 25 ml. portions of methanol.

The resulting residue was then dissolved in approximately 5 ml. of methanol and a 1 N solution of sodium iodide in acetone (6 equivalents relative to the 2'-deoxyadenosine-5'-triphosphate by spectra) was added, followed by 75 ml. of acetone. The resulting precipitate was collected by centrifugation, washed three times with 30 ml. portions of acetone, and then dried overnight under vacuum at room temperature over phosphorus pentoxide. The resulting sodium salt of 2'-deoxyadenosine-5'-triphosphate was recovered as a white, freely water-soluble non-hygroscopic powder which was chromatographically homogeneous in both a 60:100:1.6 mixture of isobutyric acid:1 N ammonium hydroxide:0.1 N tetrasodium ethylenediaminetetraacetic acid and a 6:3:1 mixture of n-propanol:ammonium hydroxide:water, and which evidenced the expected ratio of phosphorus:2'-deoxyadenosine of 3:1, respectively.

*Example II*

The procedure employed in Example I hereinabove was repeated in every detail in this example with the following exceptions. First of all, the 4-morpholine N,N' - dicyclohexylcarboxamidinium salt of 2' - deoxyadenosine-5'-phosphoromorpholidate was replaced by equivalent amounts of the 4-morpholine N,N'-dicyclohexylcarboxamidinium salts of 2'-deoxyguanosine-5'-phosphoromorpholidate, 6 - azauridine - 5' - phosphoromorpholidate, cytidine-5'-phosphoromorpholidate, 2'-deoxycytidine-5'-phosphoromorpholidate, and thymidine-5'-phosphoromorpholidate, respectively. In addition, the molarity of the ammouium bicarbonate in the reservoir for each of these preparations was 0.40 M, 0.35 M, 0.35 M, 35 M and 0.45 M, respectively. The product distributions are shown in the following table.

TABLE I.—PRODUCT DISTRIBUTIONS
[Percent yields based on starting material]

| Nucleoside | Mono-PO$_4$ | Di-PO$_4$ | Tri-PO$_4$ | Isolated Na Salt of Tri-PO$_4$ |
|---|---|---|---|---|
| 2'-deoxyadenosine | 7 | 5 | 82 | 73 |
| 2'-deoxyguanosine | 7 | 6 | 82 | 77 |
| 6-azauridine | 9 | 5 | 82 | 77 |
| Cytidine | 5 | 7 | 84 | 80 |
| 2'-deoxycytidine | 5 | 7 | 82 | 80 |
| Thymidine | 4 | 9 | 81 | 75 |

*Example III*

The procedure employed in Example I hereinabove was again repeated in every detail except for the following. The 4-morpholine N,N'-dicyclohexylcarboxamidinium salt of 2'-deoxyadenosine-5'-phosphoromorpholidate was replaced by equivalent amounts of adenosine-5'-phosphoromorpholidate 4 - morpholine N,N' - dicyclohexylcarboxamidinium salt, adenosine - 5' - phosphoropiperidate 4 - morpholine N,N' - dicyclohexylcarboxamidinium salt, adenosine - 5' - phosphoropiperidate 1-piperidine N,N' - dicyclohexylcarboxamidinium salt, 2-fluoroadenosine - 5' - phosphoramidate 1 - pyrrolidine N,N' - diethylcarboxamidinium salt, guanosine - 5'-phosphoropiperidate 4 - morpholine N,N' - dibutylcarboxamidinium salt, 8 - azaguanosine - 5' - phosphoromorpholidate 4 - morpholine N,N' - dicyclohexylcarboxamidinium salt, xanthosine - 5' - phosphoropyrrolidate 1 - pyrrolidine N,N' - di - p - tolylcarboxamidinium salt, inosine - 5' - phosphoro - n - butylamidate 4 morpholine N,N' - dicyclohexylcarboxamidinium salt, 6-mercapto-9-(β - D-ribofuranosyl)purine - 5' - phosphorodimethylamidate 1 - pyrrolidine N,N' - di - n - propylcarboxamidinium salt, uridine - 5' - phosphoropiperidate 1-piperidine N,N' - di(methylcyclohexyl)carboxamidinium salt, and 2' - deoxy - 5 - trifluoromethyluridine-5'-phosphorobenzylamidate 4 - morpholine N,N' - dicyclohexylcarboxamidinium salt, respectively. In addition, the dimethylsulfoxide was rendered substantially anhydrous by distillation from, and storage for 4 days at room temperature over, Linde Molecular Sieve Type 4A. In each case, a good yield of the corresponding nucleoside-5'-triphosphate, isolated as the lithium salt, was obtained, and in no case did this product show any substantial tendency to degrade to the corresponding lower phosphates during the reaction.

*Example IV*

The procedure employed in Example I hereinabove was again repeated in every detail but one, namely, tetrasodium pyrophosphate decahydrate was replaced by equivalent amounts of trisodium orthophosphate decahydrate, pentasodium, tripolyphosphate and hexasodium tetrapolyphosphate, respectively. The corresponding 2'-deoxyadenosine - 5' - diphosphate, 2' - deoxyadenosine-5'-tetraphospate and 2' - deoxyadenosine - 5' - pentaphosphate, respectively, isolated as the sodium salts, were obtained in good yields, and showing substantially no tendency to degrade to the corresponding lower phosphates during the reaction.

Example V

A solution of 5 mmols of dicyclohexylcarbodiimide in 35 ml. of t-butanol was added dropwise, over a 9-hour period, to a refluxing solution of 1 mmol of the morpholine salt of adenosine-5'-diphosphate and 2.4 mmols of morpholine in 20 ml. of aqueous 50% t-butanol. Refluxing was then continued following this addition until paper chromatography carried out on a sample of the reaction mixture [using ethanol:aqueous 1 M ammonium acetate (5:2, respectively, by volume) at pH 7.5 as the eluant] showed the absence of adenosine-5'-diphosphate. At this point, the reaction mixture was cooled to room temperature and filtered to remove the dicyclohexylurea formed during the reaction. The filter cake was washed with t-butanol, and these washings were added to the filtrate, which was then evaporated under vacuum, using a rotatory type evaporator, until the t-butanol was largely removed. The remaining aqueous solution was then extracted three times with equal volumes of diethyl ether. Next, the extracted aqueous solution was adjusted to pH 8, then applied to the top of a 2 x 20 cm. column of Dowex 2 ion exchange resin (8% cross-linked polystyrene) in the $HCO_3^-$ form and eluted with a linear gradient of 5 liters of triethylammonium bicarbonate solution (0.005 to 0.5 M), thus giving adenosine - 5' - phosphoromorpholidate (18%) followed by $P^1$-(adenosine-5') - $P^2$ - (4 - morpholino)diphosphate (83%), the latter then being isolated as the triethylammonium salt by evaporation of the pooled peak.

Example VI

The procedure employed in Example V hereinabove was repeated in every detail except for the following. First of all, the morpholine salt of adenosine-5'-diphosphate was replaced by the morpholine salts of adenosine-5'-triphosphate, adenosine-5'-tetraphosphate, adenosine-5'-pentaphosphate, 2'-deoxyadenosine - 5' - triphosphate, guanosine - 5' - diphosphate, 2'-deoxyguanosine-5'-tetraphosphate, xanthosine-5'-diphosphate, 9($\beta$-D-ribofuranosyl)-purine-5'-pentaphosphate, uridine-5' - diphosphate, uridine-5'-triphosphate, 2'-deoxyuridine-5'-tetraphosphate, 6-azauridine-5'-diphosphate, cytidine-5'-diphosphate, 2'-deoxycytidine - 5' - tetraphosphate, and thymidine-5'-diphosphate, respectively. Secondly, the amine reacted with the first five of these salts was morpholine, with the second five pyrrolidine and with the last five diethylamine. In each case, a good yield of the corresponding nucleoside - 5' - polyphosphate terminal phosphoramidate, namely, $P^1$-(adenosine-5')-$P^3$-(4-morpholino)triphosphate,
$P^1$-(adenosine-5')-$P^4$-(4-morpholino)tetraphosphate,
$P^1$-(adenosine-5')-$P^5$-(4-morpholino)pentaphosphate,
$P^1$-(2'-deoxyadenosine-5')-$P^3$-(4-morpholino)triphosphate,
$P^1$-(guanosine-5')-$P^2$-(4-morpholino)diphosphate,
$P^1$-(2'-deoxyguanosine-5')-$P^5$-(1-pyrrolidino)pentaphosphate,
$P^1$-(xanthosine-5')-$P^2$-1-pyrrolidino)diphosphate,
$P^1$-[9-($\beta$-D-ribofuranosyl)purine-5']-$P^5$-(1-pyrrolidino)pentaphosphate,
$P^1$-(uridine-5')-$P^2$-(1-pyrrolidino)diphosphate,
$P^1$-(uridine-5')-$P^3$-(1-pyrrolidino)triphosphate,
$P^1$-(2'-deoxyuridine-5')-$P^5$-diethylaminopentaphosphate,
$P^1$-(6-azauridine-5')-$P^2$-diethylaminodiphosphate,
$P^1$-(cytidine-5')-$P^2$-diethylaminodiphosphate,
$P^1$-(2'-deoxycytidine-5')-$P^5$-diethylaminopentaphosphate, and
$P^1$-(thymidine-5')-$P^2$-diethylaminodiphosphate, respectively, was obtained as the triethylammonium salt.

Example VII

The procedure employed in Example V hereinabove was again repeated in every detail but one, namely, morpholine was replaced by ammonium hydroxide. This gave a 45% yield of $P^1$-(adenosine-5')-$P^2$-aminodiphosphate, which was isolated as the triethylammonium salt.

Example VIII

The triethylammonium salt of $P^1$-(adenosine-5')-$P^2$-(4-morpholino)diphosphate, prepared as described in Example V hereinabove, was dissolved in methanol and then evaporated to dryness several times to give the "salt-free" salt. This salt was then admixed with an excess of an ethanolic 1 M solution of calcium chloride at room temperature, and the resulting precipitate was collected by filtration, washed with ethanol until the washings were free of chloride ion, and then dried, thus giving the calcium salt of $P^1$-(adenosine-5')-$P^2$-(4-morpholino)diphosphate.

By repeating this procedure using the triethylammonium salts of the nucleoside-5'-polyphosphate terminal phosphoramidates prepared as described in Example VI hereinabove, the corresponding calcium salts were obtained.

Example IX

The triethylammonium salt of $P^1$-(adenosine-5')-$P^2$-(4-morpholino)diphosphate was again rendered "salt-free" by successive evaporations from methanol. This salt was then dissolved in an excess of a methanolic solution of the 4-morpholine salt of N,N'-dicyclohexylcarbodiimide, and the thus-obtained solution was evaporated to dryness. The resulting residue was then dissolved in methanol and precipitated with diethyl ether. The precipitate was collected by filtration, washed with diethyl ether and dried, thus giving the 4-morpholine N,N'-dicyclohexylcarboxamidinium salt of $P^1$-(adenosine-5')-$P^2$-(4-morpholino)diphosphate.

By repeating this procedure using the triethylammonium salts of the nucleoside-5'-polyphosphate terminal phosphoramidates prepared as described in Example VI hereinabove, the corresponding 4-morpholine N,N'-dicyclohexylcarboxamidinium salts were obtained.

Example X

A substantially anhydrous solution of 0.25 mmol of the 4-morpholine N,N'-dicyclohexylcarboxamidinium salt of $P^1$-(adenosine-5')-$P^2$-(4-morpholino)diphosphate and 1 mmol of tributylammonium orthophosphate in 3 ml. of dimethylsulfoxide was heated at 40° C. for 24 hours. Following this reaction period 40 ml. of water were added and the resulting solution was applied to the top of a 2 x 3 cm. column of DEAE cellulose in the $HCO_3^-$ form and eluted with a linear gradient of 3 liters of aqueous triethylammonium bicarbonate solution (0.005 to 0.35 M). The major product was adenosine-5'-triphosphate, which was isolated in 71% yield as the sodium salt by the sodium iodide-acetone method described in Example I hereinabove.

By repeating this procedure using the remaining nucleoside-5'-polyphosphate terminal phosphoramidate 4-morpholine N,N'-dicyclohexylcarboxamidinium salts prepared as described in Example IX hereinabove in place of the 4-morpholine N,N'-dicyclohexylcarboxamidinium salt of $P^1$-(adenosine-5')-$P^2$-(4-morpholino)diphosphate, the corresponding higher nucleoside-5'-polyphosphates, namely, adenosine-5'-tetraphosphate, adenosine-5'-pentaphosphate, adenosine-5'-hexaphosphate, 2'-deoxyadenosine-5'-tetraphosphate, guanosine-5'-triphosphate, 2'-deoxyguanosine-5'-hexaphosphate, xanthosine - 5'-triphosphate, 9-($\beta$-D-ribofuranosyl) - purine-5'-hexaphosphate, uridine-5'-triphosphate, uridine-5'-tetraphosphate, 2'-deoxyuridine-5'-hexaphosphate, 6-azauridine-5'-triphosphate, cytidine-5'-triphosphate, 2'-deoxycytidine - 5' - hexaphosphate, and thymidine-5'-triphosphate, respectively, were prepared and isolated as the sodium salts.

Similarly, by repeating this procedure suing tributylammonium pyrophosphate in place of tributylammonium orthophosphate, the sodium salt of adenosine-5'-tetraphosphate was again obtained.

Example XI

A substantially anhydrous solution of 0.1 mmol of the 4-morpholine N,N'-dicyclohexylcarboxamidinium salt of $P^1$-(adenosine-5')-$P^2$-(4-morpholino)diphosphate and 0.3 mmol of $P^{32}$-labeled tributylammonium orthophosphate [containing 2 mc. (millicuries) of $P^{32}$] in 2 ml. of dimethylsulfoxide was heated at 35° C. for 45 hours. Following this reaction period the reaction mixture was worked up in the manner described in Example X hereinabove, and a 65% yield of the chromatographically homogeneous sodium salt of adenosine-5'-triphosphate-$\gamma$-$P^{32}$ [specific activity 3 $\mu$c. (microcuries) per $\mu$mol] was isolated from minor amounts of adenosine-5'-monophosphate, adenosine-5'-diphosphate, adenosine-5'-tetraphosphate and unreacted $P^1$-(adenosine-5')-$P^2$-(4-morpholino) diphosphate.

Controlled partial degradation of 1 $\mu$mol of the labeled product with *E. coli* alkaline phosphatase at 35° C. for 40 minutes, using 20 $\mu$l of the dialyzed enzyme, gave a mixture of adenosine, adenosine-5'-monophosphate, adenosine-5'-diphosphate and unreacted adenosine-5'-triphosphate-$\gamma$-$P^{32}$, which were separated on a micro-DEAE cellulose ($HCO_3^-$) column in the manner described in Example X hereinabove. While the ATP-$\gamma$-$P^{32}$ had a specific activity of 75,400 c.p.m. (counts per minute) per optical density unit at 259 m$\mu$, the AMP contained no isotope and the ADP fractions had a specific activity of only 740 c.p.m. per optical density unit, and this minor unidentified activity was shown by chromatography not to be due to the ADP itself. Thus, greater than 99.1% of the $P^{32}$ was located in the $\gamma$-position of adenosine-5'-triphosphate.

Example XII

A substantially anhydrous solution of 0.1 mmol of the 4 - morpholine N,N' - dicyclohexylcarboxamidinium salt of $P^1$-(adenosine-5')-$P^3$-(4-morpholino)triphosphate and 0.4 mmol of the tributylammonium salt of adenosine-5'-monophosphate in 2 ml. of dimethylsulfoxide was allowed to stand at room temperature for 4 days. Following this reaction period the reaction mixture was worked up in the manner described in Example X hereinabove, thus giving a 31% yield of the sodium salt of a $\alpha,\zeta$-bis(adenosine-5')tetraphosphate.

By repeating this procedure using the remaining nucleoside-5'-polyphosphate terminal phosphoramidate 4-morpholine N,N'-dicyclohexylcarboxamidinium salts prepared as described in Example IX hereinabove in place of the 4-morpholine N,N'-dicyclohexylcarboxamidinium salt of $P^1$ - (adenosine - 5') - $P^3$ - (4 - morpholino)triphosphate, the corresponding $\alpha,\omega$-bis(nucleoside-5')polyphosphates, namely, $\alpha,\gamma$-bis(adenosine-5')triphosphate, $\alpha,\epsilon$-bis(adenosine-5')pentaphosphate, $\alpha,\zeta$-bis(adenosine-5')hexaphosphate, $\alpha$ - (adenosine - 5') - $\zeta$ - (2' - deoxyadenosine-5')tetraphosphate, $\alpha$ - (adenosine - 5') - $\gamma$ - (guanosine-5')triphosphate, $\alpha$ - (adenosine - 5') - $\zeta$ - (2' - deoxyguanosine - 5')hexaphosphate, $\alpha$ - (adenosine - 5') - $\gamma$ - (xanthosine-5')triphosphate, $\alpha$-(adenosine-5')-$\zeta$-[9-($\beta$-D-ribofuranosyl)purine - 5']hexaphosphate, $\alpha$ - (adenosine - 5') - $\gamma$ - (uridine - 5')triphosphate, $\alpha$ - (adenosine - 5') - $\zeta$ - (uridine - 5')tetraphosphate, $\alpha$ - (adenosine - 5') - $\zeta$ - (2'-deoxyuridine - 5')hexaphosphate, $\alpha$ - (adenosine - 5') - $\gamma$ - (6 - azauridine - 5')triphosphate, $\alpha$ - (adenosine - 5') - $\gamma$ - (cytidine - 5')triphosphate, $\alpha$ - (adenosine - 5') - $\zeta$ - (2'-deoxycytidine-5')hexaphosphate, and $\alpha$-(adenosine-5')-$\gamma$-(thymidine-5')triphosphate, respectively, were prepared and isolated as the sodium salts.

Similarly, by repeating this procedure using the 4-morpholine N,N'-dicyclohexylcarboxamidinium salt of adenosine-5'-phosphomorpholidate in place of the 4-morpholine N,N'-dicyclohexylcarboxamidinium salt of $P^1$-(adenosine-5')-$P^2$-(4-morpholino)diphosphate, $\alpha,\beta$-bis(adenosine-5')-diphosphate was obtained and isolated as its sodium salt.

This procedure was again repeated using as reactants the 1-piperidine N,N'-dicyclohexylcarboxamidinium salt of adenosine-5'-phosphoropiperidate and the tributylammonium salt of adenosine-5'-diphosphate, the 4-morpholine N,N'-dicyclohexylcarboxamidinium salt of adenosine-5'-phosphoromorpholidate and the tributylammonium salt of adenosine-5'-triphosphate, and the 4-morpholine N,N'-dicyclohexylcarboxamidinium salt of $P^1$-(adenosine-5')-$P^3$-(4-morpholino)triphosphate and the tributylammonium salt of adenosine-5'-diphosphate, respectively, thus giving the corresponding $\alpha,\omega$-bis(nucleoside-5')polyphosphates, namely, $\alpha,\gamma$-bis(adenosine-5')triphosphate, $\alpha,\zeta$-bis(adenosine-5')tetraphosphate, and $\alpha,\epsilon$-bis(adenosine-5')pentaphosphate, respectively, which were isolated as the sodium salts.

It will be obvious to those skilled in the art that other changes and variations can be made in carrying out the present invention without departing from the spirit and scope thereof as defined in the appended claims.

I claim:

1. A process for the preparation of nucleoside-5'-polyphosphates which comprises reacting, under substantially anhydrous conditions in a dialkyl sulfoxide, a nucleoside-5'-polyphosphate terminal phosphoramidate tertiary amine salt with a tertiary amine salt of an inorganic phosphate containing at least one phosphoryl group.

2. A process for the preparation of nucleoside-5'-polyphosphates containing one nucleoside moiety which comprises reacting, under substantially anhydrous conditions in dimethylsulfoxide, a nucleoside-5'-polyphosphate terminal phosphoramidate tertiary amine salt with a tertiary amine salt of an inorganic phosphate containing at least one phosphoryl group.

3. A process for the preparation of $\alpha,\omega$-bis(nucleoside-5')-polyphosphates which comprises reacting, under substantially anhydrous conditions in a dialkyl sulfoxide solvent, a member selected from the group consisting of a nucleoside-5'-phosphoramidate tertiary amine salt and a nucleoside - 5' - polyphosphate terminal phosphoramidate tertiary amine salt with a tertiary amine salt of a nucleoside-5'-phosphate containing at least one phosphoryl group.

4. A process for the preparation of purine nucleoside-5'-polyphosphates containing one nucleoside moiety which comprises reacting, under substantially anhydrous conditions in dimethylsulfoxide, a purine nucleoside-5'-polyphosphate terminal phosphoramidate N,N'-di(hydrocarbon substituted)carboxamidinium salt containing from 2 to 7 phosphoryl groups, inclusive, with a trialkylammonium salt of an inorganic phosphate containing from 1 to 4 phosphoryl groups, inclusive.

5. A process for the preparation of pyrimidine nucleoside-5'-polyphosphates containing one nucleoside moiety which comprises reacting, under substantially anhydrous conditions in dimethylsulfoxide, a pyrimidine nucleoside-5'-polyphosphate terminal phosphoramidate N,N'-di(hydrocarbon substituted)carboxamidinium salt containing from 2 to 7 phosphoryl groups, inclusive, with a trialkylammonium salt of an inorganic phosphate containing from 1 to 4 phosphoryl groups, inclusive.

6. A process for the preparation of $\alpha,\omega$-bis(purine nucleoside-5')polyphosphates which comprises reacting, under substantially anhydrous conditions in dimethylsulfoxide, a member selected from the group consisting of a purine nucleoside-5'-phosphoramidate N,N'-di(hydrocarbon substituted)carboxamidinium salt and a purine nucleoside-5'-polyphosphate terminal phosphoramidate N,N'-di(hydrocarbon substituted)carboxamidinium salt containing from 2 to 7 phosphoryl groups, inclusive, with a trialkylammonium salt of a purine nucleoside-5'-phosphate containing from 2 to 10 phosphoryl groups, inclusive.

7. A process for the preparation of $\alpha,\omega$-bis(pyrimidine-nucleoside-5')polyphosphates which comprises reacting, under substantially anhydrous conditions in dimethylsulfoxide, a member selected from the group consisting of a pyrimidine nucleoside-5'-phosphoramidate N,N'-di (hydrocarbon substituted)carboxamidinium salt and a pyrimidine nucleoside-5'-polyphosphate terminal phosphoramidate N,N'-di(hydrocarbon substituted)carboxamidinium salt containing from 2 to 7 phosphoryl group, inclusive, with a trialkylammonium salt of a pyrimidine nucleoside-5'-phosphate containing from 2 to 10 phosphoryl groups, inclusive.

8. A process for the preparation of α-(purine nucleoside - 5') - ω - (pyrimidine nucleoside-5')polyphosphates which comprises reacting, under substantially anhydrous conditions in dimethylsulfoxide, a member selected from a first group consisting of purine and pyrimidine nucleoside-5'-phosphoramidate N,N'-di(hydrocarbon substituted)carboxamidinium salts and purine and pyrimidine nucleoside-5'-polyphosphate terminal phosphoramidate N,N'-di(hydrocarbon substituted)carboxamidinium salts containing from 2 to 7 phosphoryl groups, inclusive, with a member selected from a second group consisting of trialkylammonium salts of purine and pyrimidine nucleoside-5'-phosphates containing from 2 to 10 phosphoryl groups, inclusive, the member of said first group containing a purine moiety when the member of said second group contains a pyrimidine moiety and a pyrimidine moiety when the member of said second group contains a purine moiety.

9. A process for the preparation of adenosine-5'-triphosphate which comprises reacting, under substantially anhydrous conditions in dimethylsulfoxide, the 4-morpholine N,N'-dicyclohexylcarboxamidinium salt of $P^1$-(adenosine-5')-$P^2$-(4-morpholino)diphosphate with bis-tri-n-butylammonium orthophosphate.

10. A salt selected from the group consisting of the alkali metal, alkaline earth metal, ammonium, trialkylammonium and carboxamidinium salt of a nucleoside-5'-polyphosphate terminal phosphoramidate containing from 2 to 7 phosphoryl groups, inclusive.

11. A salt selected from the group consisting of the alkali metal, alkaline earth metal, ammonium, trialkylammonium and carboxamidinium salt of a purine nucleoside-5'-polyphosphate terminal phosphoramidate containing from 2 to 7 phosphoryl groups, inclusive.

12. A salt selected from the group consisting of the alkali metal, alkaline earth metal, ammonium, trialkylammonium and carboxamidinium salt of a pyrimidine nucleoside-5'-polyphosphate terminal phosphoramidate containing from 2 to 7 phosphoryl groups, inclusive.

13. The triethylammonium salt of $P^1$-(adenosine-5')-$P^2$-(4-morpholino)diphosphate.

14. The 4-morpholine N,N'-dicyclohexylcarboxamidinium salt of $P^1$-(adenosine-5')-$P^2$-(4-morpholino)diphosphate.

15. The triethylammonium salt of $P^1$-(adenosine-5')-$P^3$-(4-morpholino)triphosphate.

16. The 4-morpholine N,N'-dicyclohexylcarboxamidinium salt of $P^1$-(adenosine-5')-$P^3$-(4-morpholino)triphosphate.

17. The triethylammonium salt of $P^1$-(adenosine-5')-$P^2$-aminodiphosphate.

18. The triethylammonium salt of $P^1$-(uridine-5')-$P^2$-(1-pyrrolidino)diphosphate.

19. The 4-morpholine - N,N' - dicyclohexylcarboxamidinium salt of $P^1$-(uridine-5')-$P^2$-(1-pyrrolidino)diphosphate.

References Cited by the Examiner

UNITED STATES PATENTS 3,089,869   5/1963   Mauvernay _____ 260—211.5

OTHER REFERENCES

Chambers et al., Jour. Amer. Chem. Soc., vol. 80, July 20, 1958, pp. 3749–3752.

Moffatt et al., Jour. Amer. Chem. Soc., vol. 80, July 20, 1958, pp. 3756–3761.

LEWIS GOTTS, *Primary Examiner.*

JONNIE R. BROWN, *Assistant Examiner.*